Nov. 8, 1932.  J. H. KNAUER  1,887,135
GLASS TILE
Filed March 18, 1931   2 Sheets-Sheet 2

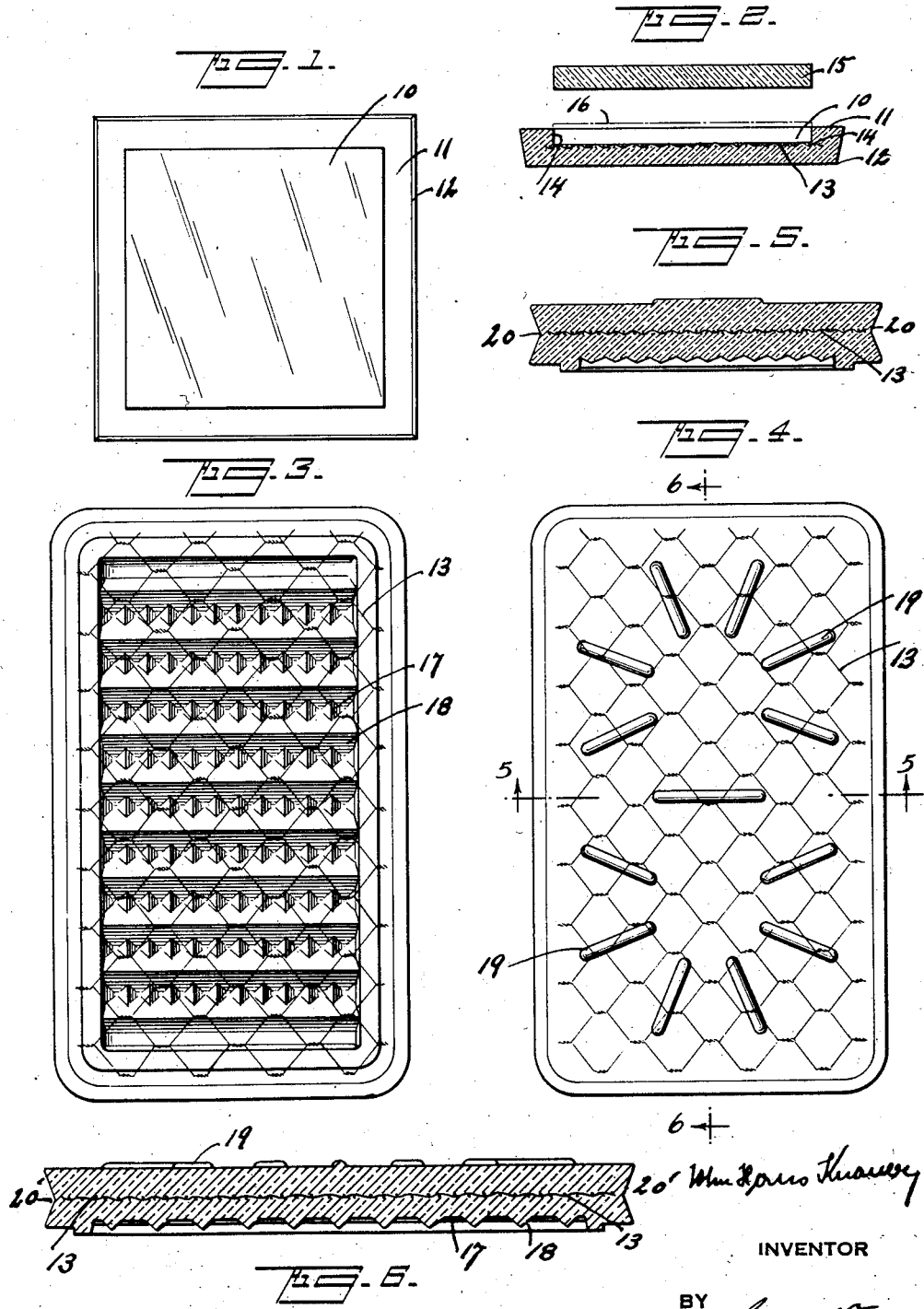

INVENTOR
BY
ATTORNEY

Patented Nov. 8, 1932

1,887,135

UNITED STATES PATENT OFFICE

JOHN HANS KNAUER, OF NEW YORK, N. Y., ASSIGNOR TO RENE G. LE BROSI, OF NEW YORK, N. Y.

GLASS TILE

Application filed March 18, 1931. Serial No. 523,547.

This invention relates to methods of manufacture, together with the articles of manufacture, and has for an object the production of thick cast, pressed and annealed glass tiles comprising a wire net reinforcing system, for the carrying of static loads and other structural purposes.

It is also an object of this invention to provide manufacturing stages for the production of heavy cast, pressed and annealed glass anti-skid dynamic load carrying pavement blocks comprising wire net reinforcing and methods of support by concrete.

It is also an object of this invention to provide methods of production for, and articles of manufacture consisting of heavy cast, pressed and annealed light-diffusing reflectors and refractors comprising wire net reinforcing.

With these and other objects in view, the invention consists in the methods of manufacture as well as the articles of manufacture, all as will be more fully described in this specification and particularly pointed out in the claims.

Referring to the accompanying drawings forming a part of this specification, in which like numerals represent like parts in all the views:—

Figure 1 is a top view of a lower half of one of my thick square glass tiles which has been cast and shaped in a mould, with an open rectangular recess 10 depressed about one-half the thickness of the tile and adapted to receive a rectangular piece of wire netting which may be laid therein occupying the area of the said recess. Here 11 is the upper surface of the glass and 12 the lower edge of the square glass which is smaller than the top square to enable me to successfully cast the block of glass and to remove it from the mould. In this particular method of manufacture, a unit mass of molten glass is made to occupy the space above the wire netting, or a unit of heavy glass is laid on top of the wire mesh and the whole system brought up to the welding temperature, when pressure is applied by means of a suitable ram, followed by the annealing process.

Figure 2 shows a section through a like thick rectangular glass tile, but in the process of manufacture according to a somewhat different plan. Here the square of wire mesh illustrated in edge view at 13 is laid in and centered in the mould of manufacture, before any glass is poured in, and some of the molten glass flows over the edge surfaces of the square of wire mesh as shown at 14—14. Above 15 represents a mass of molten glass about to be placed over the wire mesh 13 in the recess 10. The molten mass of glass 15 is shown here in diagrammatic form merely to indicate that the proper amount of molten glass is added to cover and weld with the hot wire 13 in the lower cast of the tile. The dotted line 16 indicates the uppermost surface of the finished wire reinforced tile after pressing and annealing.

Figure 3 is an underside view of one of my thick wire-reinforced reflector refractors for light diffusing showing the prisms 17 and 18, with the wire mesh 13 cast into the block and pressed and annealed therein. This design represents one of my dynamic load carrying tiles for heavy duty structural purposes, when light transmission and diffusion is desired.

Figure 4 is the reverse surface of this tile showing the cast glass anti-skid protuberances 19—19 to prevent pedestrians from slipping, when my reinforced light diffusing tile is made a part of a sidewalk.

Figure 5 is a section through this tile cut along the broken line 5—5, showing the edge of the wire reinforcing netting and the grooved edge 20—20.

Figure 6 is a section let through the dotted line 6—6 and showing the grooved edge 20—20.

Figure 7:
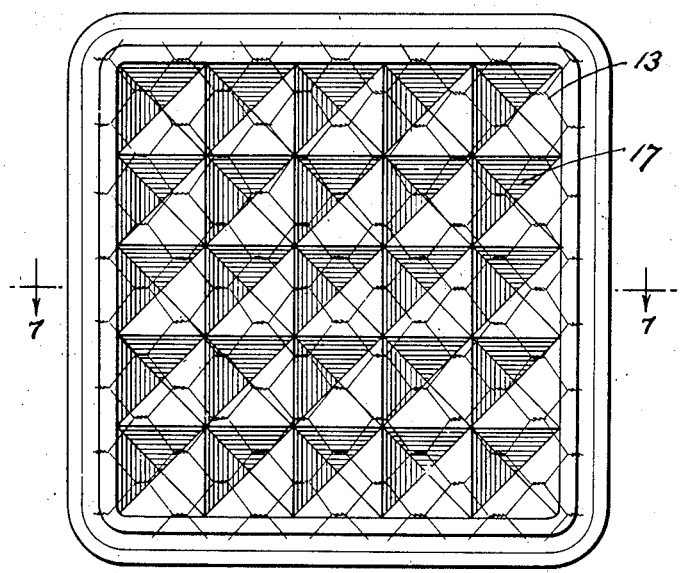
Figure 7 is a surface of one of my large square wire reinforced light diffusing tiles with a somewhat different design of reflector.
Figure 8:
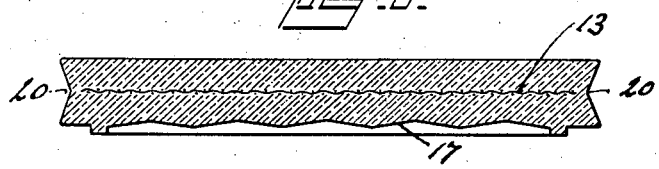
Figure 8 is a section through the light diffusing wire reinforced tile, taken as on the broken line 7—7 of Figure 7.
Figure 9:
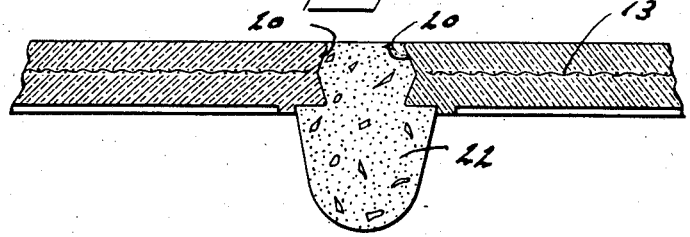
Figure 9 is a section cut through where two of my wire reinforced structural glass tiles are united and supported by the cast concrete mass 22. In this view, it is made clear how the supporting concrete of a construction supports each element of my composite tile and distributes the load and strain thereof.

I am aware, of course, of the fact that it is old to roll wire mesh or netting into thin sheets of glass for windows, skylights and partitions, but the fabrication of my new articles of manufacture comprising heavy cast glass, load carrying, light diffusing elements, is based upon different principles and processes, including the formation of a half-cast with a recess in one surface, a metallic or other reinforcement disposed within the recess, and the completion of the tile element by pouring molten glass into the recess over the reinforcement. Thus it will be seen that the half-cast is utilized as a mold for casting the second half of the tile, and that all of the edges of the reinforcement are completely embedded in the glass.

Whereas, I have shown several forms and designs of heavy cast and annealed glass wire reinforced tiles, it is obvious that those skilled in the art may vary the shapes and light diffusing elements without departing from the spirit of this invention, and, therefore, it is not desired to be limited to the foregoing, except as may be demanded by the claims.

Having described my invention, I claim :—

1. The method of fabricating a reinforced cast glass tile, which consists in casting a part thereof provided with a recess; placing a precut piece of metallic reinforcement in said recess; filling said recess with heated glass over said reinforcement; applying welding temperature and welding pressure to the inserted glass; and annealing the completed reinforced cast glass tile.

2. The method of fabricating a reinforced cast glass tile which consists in placing a precut piece of metallic reinforcement in a mold in spaced relation to the sides of said mold; pouring molten glass into said mold to form a half-cast with said reinforcement constituting a surface thereof; applying glass over said reinforcement to form the other half of the tile; and subjecting the two halves to temperatures sufficient to weld them together with the reinforcement completely embedded therein.

3. The method of fabricating a reinforced cast glass tile which consists in placing a metallic reinforcement in a glass casting mold in spaced relation to all sides of said mold; surrounding said reinforcement with molten glass filling said mold; and subjecting the completed glass cast to a slow and controlled rate of cooling.

4. The method of fabricating a reinforced cast glass tile which consists in forming a portion of said tile with upstanding edge portions establishing walls surrounding a centralized recess; causing a metallic reinforcement to lie within said walls in said recess; filling said recess above said reinforcement with the other portion of said tile; and applying welding heat to the assembled portions.

5. The method of fabricating a reinforced cast glass tile which consists in forming a partial-cast having a recess in one surface; causing a metallic reinforcement to lie within said recess; using said partial-cast as a mold for casting the rest of the tile; and subjecting the combined portions to welding heat.

6. A reinforced glass tile the same comprising a plurality of cast portions welded together; a metallic reinforcement completely embedded therein; and a channel formed in the edge portion of the completed tile.

7. A reinforced glass tile the same comprising a plurality of cast portions welded together; a metallic reinforcement completely embedded therein at the plane of the weld; and reverse bevels formed in the edge portion of the completed tile, said bevels meeting substantially in the plane of the weld.

8. A reinforced glass tile the same comprising a plurality of cast portions welded together; a metallic reinforcement completely embedded therein; and a V-shaped channel formed in the edge portion of the completed tile.

9. A reinforced glass tile the same comprising a plurality of cast portions welded together; a metallic reinforcement completely embedded therein at the plane of the weld; and a V-shaped channel formed in the edge portion of the completed tile, the point of the V being substantially in the plane of the weld.

10. The method of fabricating a reinforced cast glass tile which consists in placing a metallic reinforcement in a glass casting mold provided with channel-forming sides, said reinforcement placed in spaced relation to all sides of said mold and substantially in the plane of the center of said channel-forming sides; surrounding said reinforcement with molten glass filling said mold; and subjecting the completed glass cast to a slow and controlled rate of cooling to produce the reinforced tile having a cement-receiving channel.

11. The method of fabricating a reinforced cast glass tile which consists in placing a metallic reinforcement in a glass casting mold provided with V-shaped channel-forming sides, said reinforcement placed in spaced relation to all sides of said mold and substantially in the plane of the point of the V of said channel-forming sides; surrounding said reinforcement with molten glass filling said mold; and subjecting the completed glass cast to a slow and controlled rate of cooling to produce the reinforced tile having a cement-receiving channel.

Signed at 101 Park Ave. New York in the county of New York and State of New York this 13th day of March A. D. 1931.

JOHN HANS KNAUER.